United States Patent [19]

Eppler, Jr.

[11] 4,075,435
[45] Feb. 21, 1978

[54] METHOD AND APPARATUS FOR AUTOMATIC DICTATION PLAYBACK CONTROL

[75] Inventor: William G. Eppler, Jr., Westport, Conn.

[73] Assignee: The VSC Company, Westport, Conn.

[21] Appl. No.: 654,026

[22] Filed: Jan. 30, 1976

[51] Int. Cl.² ............................................. G11B 15/18
[52] U.S. Cl. ......................................... 179/100.1 VC
[58] Field of Search ................... 179/100.1 VC, 1 VC; 340/148; 360/69, 71

[56] References Cited

U.S. PATENT DOCUMENTS 3,532,835  10/1970  Nakayama ................. 179/100.1 VC
3,614,336  10/1971  Patey ......................... 179/100.1 VC

FOREIGN PATENT DOCUMENTS 776,656  6/1957  United Kingdom ...... 179/100.1 VC

Primary Examiner—Bernard Konick
Assistant Examiner—Alan Faber
Attorney, Agent, or Firm—Charles E. Pfund

[57] ABSTRACT

A reproducer for recorded speech or the like is controlled to present a regular stream of words at a rate suitable for transcribing as in dictation. For this purpose word presence or absence is detected in the audio signal reproduced from the record, an integrator is arranged to integrate up during word presence and down during word absence toward separately selectable integration end points and the motor drive for the record is controlled to stop when the word presence integration end point is reached and restarted when the word absence integration end point is reached. A coupling between the word detector and the motor control prevents motor stoppage during the presence of a word.

3 Claims, 2 Drawing Figures

METHOD AND APPARATUS FOR AUTOMATIC DICTATION PLAYBACK CONTROL

BACKGROUND OF THE INVENTION

This invention relates generally to audible reproducers from a record medium for transcribing speech and in particular to systems the type of which the record is automatically run and stopped to produce an audible speech signal at a rate at which it can be transcribed by a typist.

SUMMARY OF THE INVENTION

The present invention permits a dictation reproduction control which can be selected to match the speaking rate of the dictator with the transcribing rate of the typist in a manner which permits substantially continuous typing operation as the record is reproduced. For this purpose the invention includes a logical detector for the presence and absence of words in the audio signal reproduced from the record and integrates in opposite directions during the presence and absence of words. By providing separate selectively adjustable integration end points for the two directions of integration the operator is capable of selecting the length of the word group reproduced and the length of the pause between such groups. Thus the word group which the typist is capable of fixing in her memory as a burst of words corresponding to a phrase, for example, is selectable and the pause between such bursts of words corresponding to the length of time such phrase takes to be typed by a particular typist is also selectable. Accordingly the dictation can proceed on a substantially continuous basis with on-off word groups presented to the typist without intervention of manual control except for the usual playback requirements and manual override of the automatic system.

DESCRIPTION OF THE PREFERRED EMBODIMENT

Figure 1:
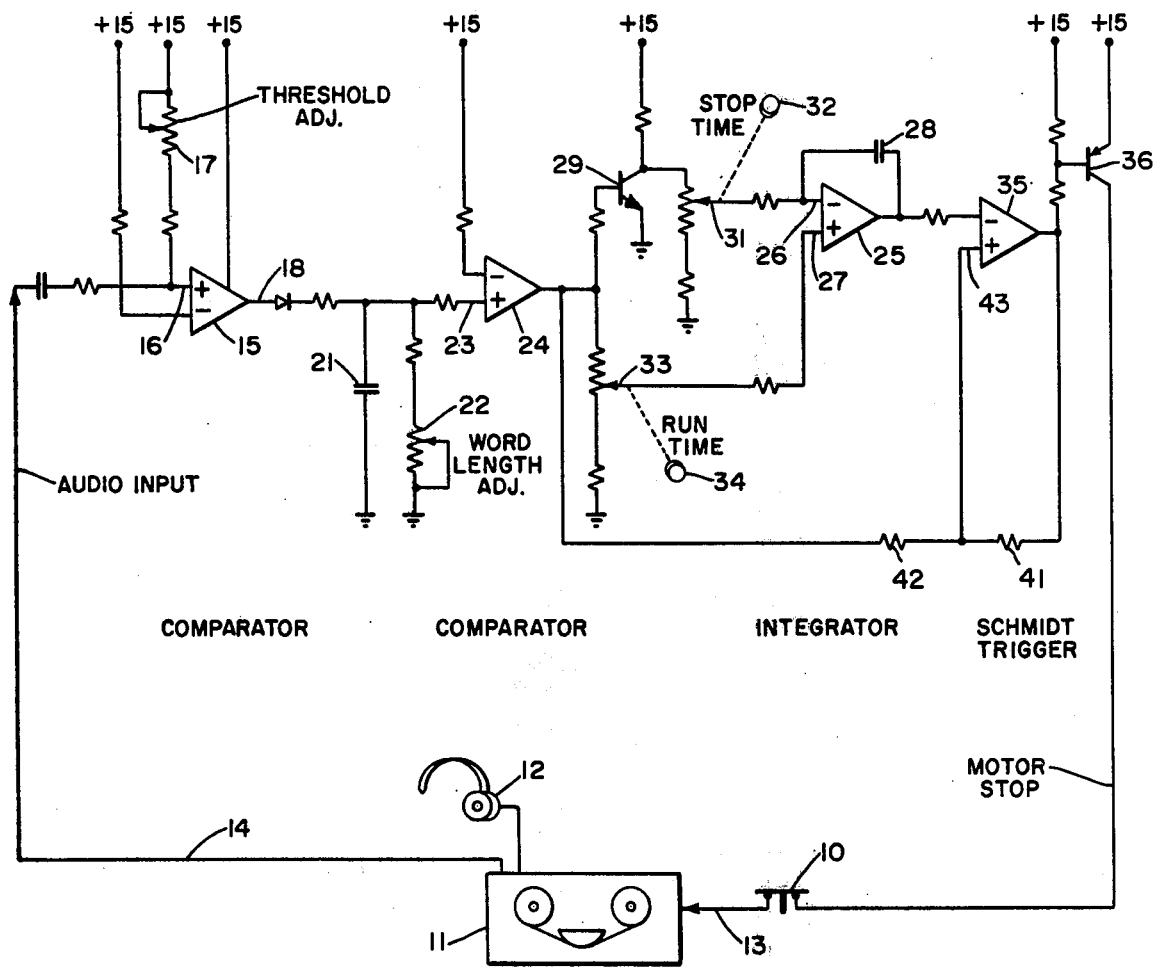
FIG. 1 is a schematic diagram of the preferred embodiment.

In the drawing a conventional playback unit 11 with associated audio reproducer 12 such as the headset is provided. The unit 11 can be of the open reel or cassette type using magnetic tape or any other record medium which reproduces by recorded signal by moving the record medium at playback speed with a motor drive. A start-stop manual override control 10 for the motor in the unit 11 is provided.

The audio playback signal applied to the headset 12 is also supplied on a line 14 which applies the audio signal to one input of an adjustable threshold amplifier 15. The amplifier 15 has an adjustable voltage level at terminal 16 as determined by adjustable resistor 17. The adjustment 17 is set so that the as threshold circuit 15 logically detects the presence of word signals on line 14 as an audio level, corresponding to a word being spoken which exceeds the threshold set by the operating voltage applied to terminal 16, the amplifier 15 changes its output level on line 18. At the end of a word the audio signal on line 14 disappears and the threshold level at terminal 16 causes the threshold amplifier 15 to revert to its normal state and establish a level on output line 18 corresponding to the absence of a word signal on line 14.

The signal on line 18 charges capacitor 21 when a word is present and when a word is absent the capacitor 21 discharges through the path including adjustable resistor 22. Adjustment 22 permits the time constant of the charge-discharge circuit to be set such that the word presence signal on line 18 is maintained at terminal 23 of a comparator 24, but the level on terminal 23 drops when the absence of signal on line 18 corresponds to the pause normally appearing between words as they are spoken. Thus, the signal at terminal 23 is the word presence or absence detection signal averaged to eliminate inter-syllabic pauses which generally are shorter than the pauses between individual words.

The output of comparator 24 is applied to an integrator which includes operational amplifier 25, opposite polarity inputs 26, 27, and integration capacitor 28. The polarity reversal for the output signal of comparator 24 is obtained by an inverter 29, operated at unity gain. The signal level applied to integrator input 26 is controlled by adjustable gain control potentiometer 31 which is adjusted by means of a manual control 32. The integration signal applied to input terminal 27 is derived from an adjustable potentiometer 33 which is selectively adjustable by means of manual control 34. The potentiometers 31 and 33 effectively serve as gain controls for the logical signals from comparator 24 representing word presence or word absence. Thus, the adjustment of potentimeter 33 which causes the integrator 25 to integrate in a positive direction controls the sample length or word group length which will be reproduced before the high integration and point established by a Schmitt trigger 35 is reached. For word absence the opposite polarity signal on terminal 26 integrates in the opposite direction and when the low threshold is reached by integrating the signal established by the gain setting of potentiometer 31 Schmitt trigger 35 reverses its output.

The output of trigger 35 is coupled to a power transistor 36 which is directly connected in the motor control line 13. Conventional manual override and playback elements may be provided by the manual switch 10.

An interconnection between the output terminal of Schmitt trigger 35 and the output terminal of comparator 24 includes voltage divider resistors 41, 42, the junction of which is connected to an input 43 of trigger circuit 35. This interconnection prevents the stopping of the motor in the middle of a word even though the high integration level is reached at such time. Essentially, the operatin comprises a high output on trigger circuit 35 corresponding to motor run conditions with the presence of a word causing a high output for comparator 24. Thus, when both ends of the voltage divider 41, 42, are at the high output level the junction connected to terminal 43 prevents the Schmitt trigger 35 from triggering to low output. However, once the integrator 25 has reached the high threshold level of the trigger circuit 35, the occurrence of the end of a word detected by comparator 24 to cause its output to go low will condition the trigger circuit 35 to accept the integrator output and trigger its output to low thereby interrupting the motor circuit by rendering transistor 36 non-conductive.

Figure 2:
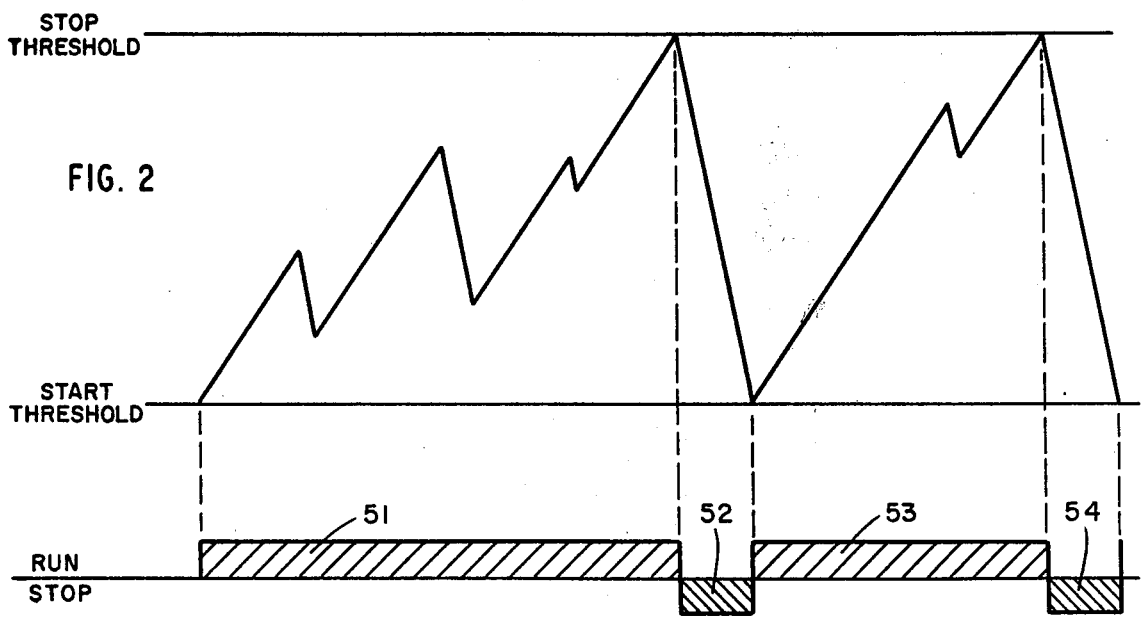
FIG. 2 is an integration timing diagram illustrating operation of the invention.

The operation of the circuit is believed to be clear from the foregoing description and can be explained with reference to FIG. 2. By adjusting the controls 32, 34, the operator can achieve any desired length of word grouping interspersed with any desired length of pause and these selected parameters will be maintained more or less constant irrespective of the change in the speaking rate of the person who dictated the tape or the introduction of normal dictating pauses. As illustrated in FIG. 2, speech with substantial pauses produces positive and negative integration which extends the RUN interval 51 which is followed by a standard STOP interval 52. The next RUN interval 53 has fewer pauses and thus is shorter in time but contains the approximate same word content as interval 51. Again, the succeeding STOP interval 54 is of standard length. If the integration gain (the + and − slope in FIG. 2) is adjusted to keep the level below the STOP threshold for a given distribution of speech and pause intervals, the reproducer will run for extended periods. Conversely, by adjusting the integration rate, any desired balance between length of word group and stop time can be achieved. Thus, by these two adjustments the typist can generally set the word flow rate to correspond to her typing speed and have the device deliver word groupings at a speed which can be comfortably transcribed.

Modifications in the details of the circuit disclosed will be apparent to those skilled in the art, and, accordingly, the invention is not to be considered as limited thereto but only by the scope of the appended claims.

I claim:

1. An automatic dictation playback controller comprising:

a record playback reproducer having a start-stop controlled motor;

a circuit means coupled to be responsive to the audio signal reproduced from said record for logically detecting the presence and absence of words;

integrator means responsive to said circuit means for producing an integrated value by integrating in one direction during word occurrence and in the other direction during word absence;

means for setting integration end points in both of said directions; and motor control means responsive to said integrated value reaching the end point approached during word presence for stopping said motor and for starting said motor when said integrated value reaches the end point approached during word absence.

2. A controller in accordance with claim 1 and including a coupling means between said circuit means and said motor control means for preventing stopping of said motor during presence of a word.

3. The method of reproducing a continuous speech recording for substantially continuous transcribing comprising the steps of:

operating the record reproducer to obtain the signal recorded on a record medium;

analyzing said signal for word content by detecting word presence and word absence; and controlling operation of said reproducer so as to allow a substantially constant rate of transcription of word content by counting said word presence minus said word absence.